United States Patent [19]

Lipowski et al.

[11] 4,330,450
[45] May 18, 1982

[54] AMPHOTERIC WATER-IN-OIL SELF-INVERTING POLYMER EMULSION

[75] Inventors: Stanley A. Lipowski, Livingston; John J. Miskel, Jr., Mendham, both of N.J.

[73] Assignee: Diamond Shamrock Corporation, Dallas, Tex.

[21] Appl. No.: 84,986

[22] Filed: Oct. 15, 1979

[51] Int. Cl.$^3$ .............. C08L 27/06; C08L 29/02; C08L 31/02; C08L 39/08
[52] U.S. Cl. .................... 524/547; 526/89; 526/209; 526/213; 162/168.1; 162/168.3; 166/295; 175/64; 210/732; 210/733; 210/734; 524/801; 524/551; 524/555; 524/556; 524/559; 524/548; 524/168.1; 524/168.3
[58] Field of Search ............... 260/29.6 H, 29.6 TA, 260/29.6 HN, 23 EM

[56] References Cited

U.S. PATENT DOCUMENTS

| | | | |
|---|---|---|---|
| 3,284,393 | 11/1966 | Vanderhoff et al. | 526/287 |
| 4,022,731 | 5/1977 | Schmitt | 260/29.6 E |
| 4,022,736 | 5/1977 | Schmitt | 260/29.6 H |
| 4,077,930 | 3/1978 | Lim et al. | 260/29.6 H |
| 4,147,681 | 4/1979 | Lim et al. | 260/29.6 TA |

*Primary Examiner*—Harold D. Anderson
*Attorney, Agent, or Firm*—Leslie G. Nunn, Jr.

[57] ABSTRACT

An amphoteric water-in-oil self-inverting polymer emulsion is prepared which contains a copolymer of (1) a nonionic vinyl monomer and (2) an amphoteric vinyl monomer or a terpolymer of (1) a nonionic vinyl monomer, (2) an anionic vinyl monomer and (3) a cationic vinyl monomer in the aqueous phase, a hydrocarbon oil for the oil phase, a water-in-oil emulsifying agent and an inverting surfactant. An example of a copolymer is a copolymer of (1) a nonionic vinyl monomer such as acrylamide or methacrylamide and (2) an amphoteric vinyl monomer such as a reaction product of dimethylaminoethyl methacrylate and monochloroacetic acid. An example of a terpolymer is a terpolymer of (1) a nonionic vinyl monomer such as acrylamide or methacrylamide, (2) an anionic vinyl monomer such as sodium acrylate and (3) a cationic vinyl monomer such as a triethyl ammonium ethyl methacrylate methosulfate salt. The emulsion is useful in papermaking, treatment of sewage and industrial wastes, drilling muds and secondary and tertiary recovery of petroleum by water flooding.

9 Claims, No Drawings

AMPHOTERIC WATER-IN-OIL SELF-INVERTING POLYMER EMULSION

BACKGROUND OF THE INVENTION

1. Field of the Invention

This invention relates to amphoteric water-in-oil self-inverting polymer emulsions for use in papermaking, sewage treatment, drilling muds and petroleum recovery by water flooding.

2. Description of the Prior Art

Water-in-oil self-inverting polymer emulsions are used in commercial applications such as papermaking operations, treatment of sewage and industrial wastes, drilling muds, secondary and tertiary recovery of petroleum by water flooding.

Three types of polymeric emulsions, i.e., nonionic, cationic and anionic emulsions are known. Preparation of these emulsions is described in numerous patents. The internal phase of the emulsion is formed from a water solution of an ethylenic unsaturated monomer or comonomer such as (1) acrylamide, methacrylamide, (2) acrylic acid, methacrylic acid, (3) dimethylaminoethyl methacrylate, diethylaminoethyl methacrylate, dimethyl and diethylaminoethyl acrylate, allyl methacrylate and its quaternization products, (4) N-substituted methacrylamide and (5) vinyl sulfonate.

The external phase of the emulsion is formed using low HLB emulsifiers such as mono and diglycerides of fatty acids, sorbitan fatty acid monoesters, polyoxyethylene alcohols and the like dissolved in a solvent such as kerosene, xylene, toluene and chlorinated hydrocarbons.

A water-in-oil emulsion is produced by slowly adding the water phase to the oil phase under rapid agitation. The emulsion is homogenized to obtain the proper particle size and is then polymerized by one of the procedures described in the literature. After polymerization is completed, the final step is the incorporation of an inverting agent, a high HLB surfactant, into the emulsion. The finished emulsion is uniform and disperses instantly by self-inversion in a water system. Water-in-oil emulsions and their uses have been described in the prior art. The following patents are representative of the prior art.

U.S. Pat. No. 3,284,393 - Vanderhoff et al., issued Nov. 8, 1966, describes polymerization of vinyl monomer in the oil phase by forming a water-in-oil emulsion of the monomer in a hydrophobic liquid and water with a water-in-oil emulsifier and then polymerizing the emulsion with a free radical catalyst to obtain a polymeric latex where the oil phase is the dispersion medium.

U.S. Pat. No. 4,022,731 - Schmitt, issued May 10, 1977, describes a self-inverting water-in-oil emulsion containing an acrylamide polymer in the aqueous phase, hydrocarbon oil, water-in-oil emulsifier and an inverting surfactant mixture containing two sulfosuccinates or one sulfosuccinate and an alkylphenol ethoxylate.

U.S. Pat. No. 4,022,736 - Schmitt, issued May 10, 1977, describes a self-inverting water-in-oil emulsion having a copolymer of acrylic acid in the aqueous phase, hydrocarbon oil, water-in-oil emulsifier and an inverting surfactant which is a fatty alcohol ethoxylate.

U.S. Pat. No. 4,077,930 - Lim et al., issued Mar. 7, 1978, describes a stable, self-inverting water-in-oil emulsion obtained by emulsifying water soluble vinyl monomer in oil containing at least 20% emulsifier and a free radical catalyst and then polymerizing to obtain a stable polymer emulsion which can be inverted by adding water without any other reagent.

A common practice in plant operations such as in a paper mill is to change the charge in the system by switching from a nonionic polymer emulsion to a cationic or anionic polymer emulsion. In paper mill operations, the zeta potential should be determined to obtain optimum results. Choice of polymer emulsion depends on the type of charge in the previous operation and the type of charge required in the present operation. A change in charge is cumbersome and may require addition of varying quantities of a variety of polymers having different positive or negative charges.

SUMMARY OF THE INVENTION

An amphoteric water-in-oil self-inverting polymer emulsion is prepared which contains a copolymer of (1) a nonionic vinyl monomer and (2) an amphoteric vinyl monomer or a terpolymer of (1) a nonionic vinyl monomer, (2) an anionic vinyl monomer and (3) a cationic vinyl monomer in the aqueous phase, a hydrocarbon oil for the oil phase, a water-in-oil emulsifying agent and an inverting surfactant. This water-in-oil emulsion is prepared by dissolving the required monomers in the water phase, dissolving the emulsifying agent in the oil phase, emulsifying the water phase in the oil phase to prepare a water-in-oil emulsion, homogenizing the water-in-oil emulsion, polymerizing the monomers dissolved in the water phase of the water-in-oil emulsion to obtain the copolymer or terpolymer and then adding the self-inverting surfactant to obtain an amphoteric water-in-oil self-inverting water-in-oil emulsion. The emulsion is useful in papermaking, treatment of sewage and industrial wastes, drilling muds and secondary and tertiary recovery of petroleum by water flooding.

A useful copolymer is a copolymer of (1) a nonionic vinyl monomer such as acrylamide or methacrylamide and (2) an amphoteric vinyl monomer such as a reaction product of dimethylaminoethyl methacrylate and monochloroacetic acid. A useful terpolymer is a terpolymer of (1) a nonionic vinyl monomer such as acrylamide or methacrylamide, (2) an anionic vinyl monomer such as sodium acrylate and (3) a cationic vinyl monomer such as a triethyl ammonium ethyl methacrylate methosulfate salt.

DESCRIPTION OF THE PREFERRED EMBODIMENTS

Most research on water-in-oil polymer emulsions has been with nonionic, anionic or cationic polymers. Amphoteric polymers have not been studied extensively so very little is known about them. Investigation of amphoteric polymer emulsions produced by this invention has shown that they have numerous advantages over nonionic, anionic and cationic polymer emulsions.

For example, the anionic charge on an amphoteric polymer can be increased by addition of alkali and the cationic charge on an amphoteric polymer can be increased by addition of acid. The charge can be varied by small incremental alkali or acid additions. It is possible to change the charge in a system such as a paper mill operation by simple alkali or acid additions to an amphoteric polymer emulsion in the system. Use of an amphoteric polymer emulsion eliminates need for the variety of nonionic, anionic and cationic polymers which are now required to vary the charge in a system.

In a copolymer, the molar ratio of amphoteric vinyl monomer to nonionic vinyl monomer in the copolymer may be varied over a wide range, i.e., about from 1% of the amphoteric vinyl monomer to about 99% nonionic vinyl monomer, e.g., up to 70% of amphoteric vinyl monomer and 30% of nonionic vinyl monomer. The preferred molar ratio is from about 10% to about 50% of the amphoteric vinyl monomer on a molar basis in a copolymer. Since a terpolymer contains a nonionic vinyl monomer, anionic vinyl monomer and cationic vinyl monomer, the anionic vinyl monomer and cationic vinyl monomer are considered to be equivalent to an amphoteric vinyl monomer and the above copolymer ratios are applicable.

Useful water soluble nonionic vinyl monomers include acrylamide, methacrylamide, allyl alcohol, 3-methylallyl alcohol, vinyl chloride, vinyl methyl ether, vinyl ethyl ether and the like.

Useful water soluble cationic vinyl monomers include
(1) N-substituted-(N'-dialkylaminoalkyl)acrylamides such as:
   N-(diethylaminomethyl)acrylamide,
   N-(diethylaminomethyl)methacrylamide,
   N-(dimethylaminomethyl)acrylamide,
   N-(dipropylaminomethyl)acrylamide,
   N-(piperidylmethyl)acrylamide;
(2) Aminoalkylacrylates and dialkylaminoalkylacrylates such as:
   Diethylaminopropylacrylate,
   Dimethylaminoethylacrylate,
   Dimethylaminopropylacrylate;
(3) Vinylpyridine;
(4) Diallylamines such as:
   Diallylbenzylamine,
   Diallylmethylamine,
   Diallylethylamine;
(5) Quaternaries such as:
   Acrylamidopropylbenzyldimethylammonium hydroxides,
   N-methyl-vinylpyridinium chloride,
   Diallyldimethylammonium chloride,
   Diallydiethylammonium chloride,
   Acrylopropylbenzyldimethylammonium hydroxide.

Quaternaries having at least one ethylenically unsaturated substituent may also be prepared using members of groups (1), (2), (3), (4) and the like.

Useful water soluble anionic vinyl monomers include acrylic acid, 1,2-dichloroacrylic acid, 2-methyl-cis-acrylic acid, 2-methyl-trans-acrylic acid, ethylene sulfonic acid, fumaric acid, chlorofumaric acid, methylfumaric acid, itaconic acid, maleic acid, dichloromaleic acid, methylmaleic acid, methacrylic acid, styrene sulfonic acid, crotonic acid, their salts and the like.

Useful water soluble amphoteric vinyl monomers may be prepared by reacting any of the above cationic vinyl monomers with an anionic reactant such as chloroacetic acid, chlorosulfonic acid, bromoethanol sulfonic acid or the like.

The oil phase may be any inert hydrophobic liquid. A preferred group of organic liquids are the hydrocarbon liquids which include both aromatic and aliphatic compounds. Hydrocarbon liquids such as benzene, xylene, toluene, mineral oil, mineral spirits, kerosene, naphtha and the like may be used.

Free radical yielding initiators useful as catalysts in polymerizing vinyl monomers, such as benzoyl peroxide, lauroyl peroxide, 2,2'-azobis (isobutyronitrile), potassium persulfate and the like may be used in the polymerization, advantageously in amounts ranging between about 0.002 and about 0.2 percent by weight of the oil or aqueous monomer phase, depending upon the solubility of the initiator. Polymerization can also be carried out using high energy irradiation such as high energy electrons from a Van de Graaff accelerator, ultraviolet irradiation or the like.

Water-in-oil emulsifying agents useful in the present invention may be blends of low HLB and high HLB surfactants having a final HLB of 7, preferably 4 to 5. Suitable blends may be prepared using emulsifying agents from the table below entitled, "Emulsifying Agent - Chemical Composition HLB (±)". Additional details on these agents may be found in the Atlas Chemical Industries bulletin, "General Characteristics of Atlas Surfactants", copyright 1963.

| EMULSIFYING AGENT - CHEMICAL COMPOSITION | HLB (±1) |
|---|---|
| Class 100 - Mono and Diglycerides | |
| Mono and diglycerides from the glycerolysis of edible fats | 3.2 |
| Mono and diglycerides of fat forming fatty acids | 2.8 |
| Mono and diglycerides from the glycerolysis of edible fats | 2.8 |
| Mono and diglycerides from the glycerolysis of edible fats | 2.8 |
| Mono and diglycerides from the glycerolysis of edible fats | 3.5 |
| Mono and diglycerides from the glycerolysis of edible fats | 3.5 |
| Mono and diglycerides from the glycerolysis of edible fats or oils | 3.5 |
| Mono and diglycerides from the glycerolysis of edible fats and Tween 80 | 5.2 |
| Mono and diglycerides from the glycerolysis of edible fats and Tween 65 | 5.9 |
| Glycerol monostearate (acid-stable, self-emulsifying) | 11.0 |
| Class 200 - Sorbitan Fatty Acid Esters | |
| Sorbitan monooleate | 4.3 |
| Sorbitan partial fatty esters | 4.3 |
| Sorbitan partial fatty esters | 4.3 |
| Sorbitan monopalmitate | 6.7 |
| Sorbitan monostearate | 4.7 |
| Sorbitan monooleate | 4.3 |
| Sorbitan sesquioleate | 3.7 |
| Sorbitan trioleate | 1.8 |
| Sorbitan monopalmitate | 6.7 |
| Sorbitan monostearate | 4.7 |
| Sorbitan tristearate | 2.1 |
| Sorbitan monooleate | 4.3 |
| Sorbitan trioleate | 1.8 |
| Sorbitan monolaurate | 8.6 |
| Sorbitan monolaurate | 8.6 |
| Class 300 - Polyoxyethylene Sorbitan Fatty Acid Esters | |
| Polyoxyethylene sorbitan esters of mixed fatty and resin acids | 14.6 |
| Polyoxyethylene sorbitan esters of mixed fatty and resin acids | 15.4 |
| Polyoxyethylene (20) sorbitan monolaurate | 16.7 |
| Polyoxyethylene (4) sorbitan monolaurate | 13.3 |
| Polyoxyethylene (20) sorbitan monopalmitate | 15.6 |
| Polyoxyethylene (20) sorbitan monostearate | 14.9 |
| Polyoxyethylene (4) sorbitan monostearate | 9.6 |
| Polyoxyethylene (20) sorbitan tristearate | 10.5 |
| Polyoxyethylene (20) sorbitan monooleate | 15.0 |
| Polyoxyethylene (5) sorbitan monooleate | 10.0 |
| Polyoxyethylene (20) sorbitan trioleate | 11.0 |
| Class 400 - Polyoxyethylene Sorbitol Esters | |
| Polyoxyethylene sorbitol beeswax derivative | 5 |
| Polyoxyethylene sorbitol beeswax derivative | 5 |
| Polyoxyethylene sorbitol oleate-laurate | 13.2 |
| Polyoxyethylene sorbitol oleate | 9.2 |
| Polyoxyethylene sorbitol oleate | 11.4 |

| EMULSIFYING AGENT - CHEMICAL COMPOSITION | HLB (±1) |
| --- | --- |
| Polyoxyethylene sorbitol tall oil | 10.7 |
| Polyoxyethylene sorbitol tall oil | 9.7 |
| Polyoxyethylene sorbitol laurate | 11.5 |
| Polyoxyethylene sorbitol hexa-oleate | 10.2 |
| Polyoxyethylene sorbitol hexa-oleate | 11.4 |
| Polyoxyethylene sorbitol oleate | 10.2 |
| Polyoxyethylene sorbitol esters of mixed fatty and resin acids | 8.6 |
| Polyoxyethylene sorbitol lanolin derivative | 14 |
| Polyoxyethylene sorbitol lanolin derivative | 16 |
| Polyoxyethylene sorbitol tallow esters | 9.6 |
| Class 500 - Polyoxyethylene Acids | |
| Polyoxyethylene (8) stearate | 11.1 |
| Polyoxyethylene (40) stearate | 16.9 |
| Polyoxyethylene (40) stearate | 16.9 |
| Polyoxyethylene (50) stearate | 17.9 |
| Polyoxyethylene esters of mixed fatty and resin acids | 13.8 |
| Polyoxyethylene (20) palmitate | 15.5 |
| Polyoxyethylene (8) laurate | 12.8 |
| Class 600 - Polyoxyethylene Alcohols | |
| Polyoxyethylene (2) cetyl ether | 5.3 |
| Polyoxyethylene (2) stearyl ether | 4.9 |
| Polyoxyethylene (2) oleyl ether | 4.9 |
| Polyoxyethylene (4) lauryl ether | 9.7 |
| Polyoxyethylene (23) lauryl ether | 16.9 |
| Polyoxyethylene (10) cetyl ether | 12.9 |
| Polyoxyethylene (20) cetyl ether | 15.7 |
| Polyoxyethylene (10) stearyl ether | 12.4 |
| Polyoxyethylene (20) stearyl ether | 15.3 |
| Polyoxyethylene (10) oleyl ether | 12.4 |
| Polyoxyethylene (20) oleyl ether | 15.3 |
| Polyoxyethylene (12) tridecyl ether | 14.5 |
| Polyoxyethylene (15) tridecyl ether | 15.4 |
| Polyoxyethylene (12) tridecyl ether urea complex | 14.5 |
| Polyoxyethylene (6) tridecyl ether | 11.4 |
| Class 700 - Polyoxyethylene Adducts Not Otherwise Classified | |
| Polyoxyethylene fatty glyceride | 16.0 |
| Polyoxyethylene fatty glyceride | 10.8 |
| Polyoxyethylene fatty glyceride | 17.5 |
| Polyoxyethylene glyceride ester | 18.1 |
| Polyoxyethylene lanolin derivative | 11.0 |
| Polyoxyethylene lanolin derivative | 17.0 |
| Polyoxyethylene (25) oxypropylene monostearate | 16.0 |
| Polyoxyethylene alkyl amine | 15.5 |

Any inverting surfactant or inverting surfactant mixture described in the prior art may be used. These surfactants include surfactant mixtures having a HLB of about 12 to about 20. Surfactant mixtures such as sodium bis(2-ethylhexyl)sulfosuccinate and sodium bis(C-11–C15 alkyl) sulfosuccinate or ethoxylated octyl or nonyl phenol may be used. These mixtures are described in U.S. Pat. No. 4,022,731 - Schmitt, issued May 10, 1977, whose teachings on inverting surfactant mixtures are incorporated by reference herein. Preferred inverting surfactants include the condensation product of one mole of nonyl phenol and nine moles of ethylene oxide as well as its mixtures with sodium bis(2-ethylhexyl)sulfosuccinate.

The amphoteric water-in-oil self-inverting polymer emulsion is prepared by (1) dissolving (a) a water soluble nonionic vinyl monomer and a water soluble amphoteric vinyl monomer or (b) a water soluble nonionic vinyl monomer, a water soluble anionic vinyl monomer and a cationic vinyl monomer in water to form an aqueous phase, dissolving an emulsifying agent in a hydrophobic liquid to form an oil phase, emulsifying the aqueous phase in the oil phase to prepare a water-in-oil emulsion, homogenizing the water-in-oil emulsion, polymerizing under polymerization conditions the monomers dissolved in the water phase of the water-in-oil emulsion using a free radical yielding initiator as a catalyst to obtain the copolymer of (a) or terpolymer of (b) and then adding a self-inverting surfactant to an amphoteric water-in-oil emulsion.

Amphoteric water-in-oil self-inverting polymer emulsions may be prepared using the Indicated and Preferred parts by weight (pbw) ranges of the following components:

| | Indicated (pbw) | Preferred (pbw) |
| --- | --- | --- |
| polymer | 10–50 | 20–35 |
| water | 10–50 | 15–40 |
| hydrophobic liquid | 5–50 | 10–40 |
| emulsifying agent | 2–25 | 3–10 |
| free radical yielding initiator | 0.01–0.25 | 0.02–0.1 |
| inverting surfactant | 1–15 | 3–10 |

The polymer may be a copolymer or terpolymer prepared using the Indicated or Preferred parts by weight (pbw) of nonionic vinyl monomer with the appropriate monomer or monomers and monomer ratio.

| | Indicated (pbw) | Preferred (pbw) |
| --- | --- | --- |
| nonionic vinyl monomer | 30–99 | 50–90 |
| amphoteric vinyl monomer | 1–70 | 10–50 |
| anionic vinyl monomer | 1–35 | 5–25 |
| cationic vinyl monomer | 1–35 | 5–25 |
| copolymer (monomer ratio) | 99:1–3:7 | 9:1–1:1 |
| terpolymer (monomer ratio) | 48:1:1–3:3.5:3.5 | 9:0.5:0.5–5:2.5:2.5 |

The polymer may be prepared by polymerizing the appropriate monomers at from about 30 to about 70° C. over about 2 to about 20 hours with the preferred temperature range being from about 35° to about 65° C. and preferred time range being over about 4 to about 10 hours.

The amphoteric polymers present in the emulsions of this invention are versatile polyelectrolytes. They are polyampholytes having both anionic and cationic substituents. The charge on these polymeric ampholytes can be changed by addition of alkali or acid. Where a specific charge on the polyelectrolyte is required, the charge on the polymer may be "fine tuned" by small alkali or acid additions. These polyampholyte emulsions are useful in papermaking, treatment of sewage and industrial wastes, drilling muds and secondary, tertiary and enhanced oil recovery by water flooding.

In papermaking, the ease with which water drains from stock on a paper machine "wire" and amount of water retained in the wet web as it passes to and through the presses affects both speed of the machine and quality of the paper. Use of these amphoteric polymer emulsions in papermaking as drainage aids improves drainage rates and provides other benefits. Emulsion performance may be optimized by acidification or alkalinization.

These amphoteric polymer emulsions are useful in drilling muds as well as in secondary, tertiary and enhanced oil recovery (EOR). Since the charge on the polymer can be varied over a wide range, the charge can be easily changed where a specific electrical charge is required in oil production problems. These emulsions are useful in high water oil ratio (WOR), erratic channeling, channel sealing, sand and clay mobility problems.

For a fuller understanding of the nature and advantages of this invention, reference may be made to the following examples. These examples are given merely to illustrate the invention and are not to be construed in a limiting sense. All quantities, proportions and percentages are by weight and all references to temperature are °C. unless otherwise indicated.

EXAMPLE I

This example demonstrates preparation of an amphoteric water-in-oil self-inverting polymer emulsion using the following procedure.

(A) A total of 50.0 parts by weight of dimethylaminoethyl methacrylate (0.318 mole) was charged to a reactor and cooled to a temperature of 8° C. Then 30.0 parts by weight of monochloroacetic acid (0.318 mole) was added under stirring and cooling until a uniform viscous liquid was formed. Temperature of the reaction mixture rose to a maximum of 22° C. Molar ratio of the reactants was 1:1. An aqueous solution of a sample of the reaction product, a monomer, formed a heavy precipitate when treated with aqueous silver nitrate solution showing the presence of a quaternary compound.

(B) A total of 250.0 parts by weight of aqueous 52% acrylamide solution (1.83 mole), 0.2 parts by weight of a 34% aqueous diethylenetriamine pentacetic sodium salt solution and 90.0 parts by weight of tap water were charged to the reactor containing the quaternary compound prepared in (A) and stirred to form a uniform solution, the water phase for the emulsion. The water phase, an aqueous solution of comonomers, had a pH of 5.8.

(C) Utilizing a separate reactor, 180.0 parts by weight of kerosene and a mixture of 32.0 parts by weight of oleyl mono glyceride and 6.0 parts by weight of stearyl mono glyceride as the emulsifying agent were mixed and heated to 40° C. to obtain a uniform solution, the oil phase for the emulsion.

(D) The water phase from (B) was added slowly with rapid agitation to the oil phase in the reactor from (C) to obtain a water-in-oil emulsion. After emulsification, the water-in-oil emulsion was homogenized in a Waring blender and transferred to a polymerization reactor.

(E) A total of 500.0 parts by weight of the water-in-oil emulsion was sparged with nitrogen at room temperature for ½ hour, then 0.4 parts by weight of 2,2'-azo(bis)isobutyronitrile dissolved in 2.0 parts by weight of acetone was added and the mixture heated slowly to 40° C. under constant sparge with nitrogen. Temperature of polymerization was maintained at 40° C. for 3 hours and then was raised to 42° C. where a vigorous exothermic reaction raised the temperature to 60° C. over 30 minutes. The polymerization mixture was then agitated for an additional 30 minutes at 60° C. and 40.0 parts by weight of an ethoxylated (9 E.O.) nonyl phenol was added as the inverting surfactant and the viscous solution was agitated for an additional 30 minutes. During polymerization, appearance of the water-in-oil emulsion changed gradually from milky to glassy and then to semi-transparent hazy. After addition of the inverting surfactant, the emulsion had the appearance of a viscous, gray, hazy, uniform liquid. The polymer molecular weight unit and formula were as follows:

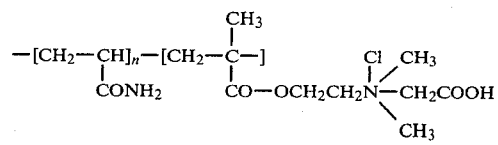

where n is 5.75.

The calculated molecular weight unit was 660.

Following data summarize the properties of the emulsion:

| | |
|---|---|
| Solids: | 42%, constant weight, moisture balance |
| Active content: | 30.4% |
| Viscosity as is: | 2640 cps, Brookfield Spindle No. 3/30 rpm, 24° C. |
| Viscosity 1% solution: | 340 cps Brookfield Spindle No. 2/30, 24° C. |
| pH 1% solution: | 6.0 |
| Flash point: | 150° F. |
| Freeze-thaw test: | Recovers to original appearance after freezing to 0° F. and thawing at room temperature, remains liquid after 3 days at 50° C. |
| Heat stability test: | |
| Flocculation test-acid: | 67% improvement in drainage time |
| Flocculation test-alkaline: | 56% improvement in drainage time |
| Cationic activity-acid: | 10.56% |
| Anionic activity-alkaline: | 15.84% |
| Intrinsic viscosity: | 27 |
| Molecular weight: | 10.9 million |
| Huggins constant: | 0.52 |

EXAMPLE II

This example demonstrates preparation of an amphoteric water-in-oil self-inverting polymer emulsion using the following procedure.

(A) Utilizing a reactor as a mixer, 137.0 parts of 52% acrylamide aqueous solution (1.0 mole), 100.0 parts tap water, 0.2 parts by weight of a 34% diethylenetriamine pentacetic sodium salt water solution, 18.0 parts by weight of acrylic acid (0.25 mole), 20.0 parts 50% sodium hydroxide aqueous solution (0.25 mole) were charged in the above order and mixed together to obtain a uniform solution having a pH of 7.8.

(B) Then, 88.0 parts by weight of a 80% active aqueous solution containing 0.25 mole of a quaternization product obtained by reaction of dimethylaminoethyl methacrylate and dimethyl sulfate was charged to (A) in the reactor and mixed together to obtain a uniform solution having a pH of 7.4, the water phase (B).

(C) In a separate reactor, 150.0 parts by weight of kerosene was charged and then 30.0 parts by weight of oleyl monoglyceride and 6.0 parts by weight of stearyl monoglyceride was added. The charge was heated to 40° C. and mixed to obtain a uniform solution, the oil phase.

(D) The water phase from (B) was then added slowly under rapid agitation to the oil phase from (C) to obtain a water-in-oil emulsion of the monomers. The resulting water-in-oil emulsion was homogenized and transferred to a polymerization reactor.

(E) The emulsion representing 500.0 parts by weight was sparged with nitrogen at room temperature for ½ hour in the polymerization reactor, then 0.6 parts by weight 2,2'-azo(bis)isobutyronitrile, dissolved in 3.0 parts by weight acetone, was added and the resulting mixture heated slowly to 40° C. under constant sparge with nitrogen. Temperature of the polymerization mixture was maintained at 40° C. for 3 hours and then raised to 43° C. where an exothermic reaction increased the polymerization temperature to 56° C. over 1 hour. The polymerization mixture was heated to 60° C. and 40.0 parts by weight of an ethoxylated (9 E.O.) nonyl phenol followed by 7.5 parts by weight of sodium bis(ethylhexyl) sulfosuccinate were added as an inverting surfactant mixture to the polymer and the emulsion was agitated for an additional ½ hour. Properties of the polymer emulsion are summarized after Example III. The polymer molecular weight unit and formula were as follows:

$$-[CH_2-CH]-[CH_2-CH]_n-[CH_2-\underset{\underset{COONa}{|}}{C}\underset{\underset{CONH_2}{|}}{H}]-[CH_2-\underset{\underset{CO-OCH_2CH_2\overset{+}{N}-SO_4CH_3}{|}}{\overset{\overset{CH_3}{|}}{C}}-]\;\;\overset{CH_3}{\underset{CH_3}{|}}$$

where n is 4.
The calculated molecular weight unit was 661.

EXAMPLE III

This example demonstrates preparation of an amphoteric water-in-oil self-inverting polymer emulsion using the following procedure.

(A) Utilizing a reactor as a mixer, 164.4 parts by weight of 52% acrylamide aqueous solution (1.2 mole), 120.0 parts by weight of tap water, 0.2 parts by weight of a 34% diethylenetriamine pentacetic sodium salt aqueous solution, 10.8 parts by weight of acrylic acid (0.15 mole), 12.0 parts by weight of 50% sodium hydroxide aqueous solution (0.15 mole) were charged in the above order to the reactor and mixed to obtain a solution having a pH of 6.2.

(B) Then 52.8 parts by weight of a 80% active dimethyl sulfate quaternary of dimethylaminoethyl methacrylate (0.15 mole) was charged to (A) in the reactor and mixed to obtain a uniform solution having a pH of 6.6, the water phase.

(C) In a separate reactor, 168.0 parts by weight of kerosene, 32.4 parts by weight of oleyl monoglyceride and 6.0 parts by weight of stearyl monoglyceride were mixed together and heated to 40° C. to obtain a uniform solution, the oil phase.

(D) Then the water phase from (B) was added slowly to the oil phase from (C) under rapid agitation to obtain a water-in-oil emulsion which was then homogenized and transferred to a polymerization reactor.

(E) The emulsion representing 500.0 parts by weight of the emulsion from (D) was sparged with nitrogen for ½ hour at 27° C. temperature in the polymerization reactor, then 0.54 parts by weight of 2,2'-azo(bis) isobutyronitrile dissolved in 3.0 parts by weight of acetone were added and mixed. The polymerization mixture was heated to 40° C. and maintained at 40° C. for 3 hours. Then the temperature was raised to 42° C. where a mild exothermic reaction raised the temperature to 48° C. over ½ hour. The polymerization mixture was then heated to 60° C. A mixture of 30.0 parts by weight of an ethoxylated (9 E.O.) nonyl phenol and 7.5 parts of sodium bis(ethylhexyl) sulfosuccinate were added as an inverting surfactant mixture to the polymer emulsion and the emulsion was agitated for an additional ½ hour.

The polymer molecular weight unit and formula were as follows:

$$-[CH_2-CH]-[CH_2-CH]_n-[CH_2-\underset{\underset{COONa}{|}}{C}\underset{\underset{CONH_2}{|}}{H}]-[CH_2-\underset{\underset{CO-OCH_2CH_2\overset{+}{N}-SO_4CH_3}{|}}{\overset{\overset{CH_3}{|}}{C}}-]\;\;\overset{CH_3}{\underset{CH_3}{|}}$$

where n is 8.
The calculated molecular weight unit was 945. Properties of the polymer emulsion together with the emulsion from Example II are given below.

Following data summarize the properties of the emulsions from Example II and Example III.

|  | Example II | Example III |
|---|---|---|
| Solids | 41.3% | 36.5% |
| Active content | 27.4% | 23.2% |
| Viscosity as is | 2,050 cps | 1,120 cps |
|  | 3/30 24° C. | 3/30 24° C. |
| Viscosity 1% solution - acid | 6 cps 2/30 24° C. | 6 cps 2/30 24° C. |
| Viscosity 1% solution - alkaline | 48 cps 2/30 24° C. | 40 cps 2/30 24° C. |
| pH 1% solution as is | 7.65 | 7.65 |
| Freeze-thaw test | passes | passes |
| Heat stability test | passes | passes |
| Flocculation test - acid Improvement in drain time | 37% | 45% |
| Flocculation test - alkaline, improvement in drain time | 58% | 64% |
| Cationic activity - acid | 7.93% | 7.56% |
| Anionic activity - alkaline | 8.32% | 3.97% |

EXAMPLE IV

This example describes determination of percent anionic and cationic activity in amphoteric polymer emulsion. This method determines the percent active ingredients in an anionic/or cationic activity titrating the emulsion with a cationic or anionic agent. The following procedure was used in this determination:

APPARATUS
  25 ml Burette with 0.05 ml graduations
  100 ml Volumetric Flask
  1000 ml Volumetric Flask
  10 ml Bulb Pipette
  15 ml Bulb Pipette
  25 ml Bulb Pipette
  250 ml Glass Stoppered Erlenmeyer Flasks REAGENTS
  Chloroform, reagent grade
  Duponol ® Solution, 0.004 mole
    Dissolve 1.152 g of Duponol ® C (100% active) in distilled water and dilute to 1 liter in a volumetric flask
  Hyamine ® Solution, 0.004 mole
    Dissolve 1.815 g (based on 98.8% assay) Hyamine in distilled water and dilute to 1 liter in a volumetric flask.
  Methylene Blue Indicator
    Dissolve 0.030 g methylene blue, reagent grade, and 50 g of anhydrous sodium sulfae, reagent grade, in 500 mls of distilled water. Add 6.5 mls of sulfuric acid (96% reagent grade) and dilute to 1000 mls with distilled water. Shake well.
  Sodium Sulfate, reagent grade Sulfuric Acid, 96% reagent grade

PROCEDURE a. Weigh between 0.2–0.5 g of the sample to be analyzed to the nearest 0.0001 g. Transfer to a 100 ml volumetric flask with distilled water, dissolve and dilute to the mark with distilled water.

b. Pipette 10 mls of the sample solution prepared in "a" into a 250 ml glass stoppered Erlenmeyer flask (or 100 ml Nessler Tube).

c. Pipette 25 mls of methylene blue indicator solution and 15 mls of chloroform into the flask. If the upper layer is colorless and the lower layer blue, titrate with the cationic reagent (Hyamine, 0.004 mole). A blue upper layer and colorless lower layer is indicative of a cationic, and the titration should be made with the anionic solution (Duponol C, 0.004 mole).

d. Titrate with the appropriate solution by running in 5 mls, shaking for 30 seconds and then adding 1 ml of titrate at a time and shaking the flask for 30 seconds after each addition.

e. When signs of the approaching end point appear, reduce the additions to 0.5 ml (more rapid separation of the temporary emulsification is an indication of the approaching end point).

f. In the Hyamine titration, the water will begin to turn blue near the end point. Add the Hyamine, 0.004 mole a drop at a time, shake for 30 seconds after each addition, and wait for 60 seconds until the aqueous layer is clear and appears as blue as the chloroform layer. The comparison is made by placing the flask in reflected light, and obstructing one's view of the interface with a stirring rod. The titration with Duponol C, 0.004 mole for a cationic sample is carried on exactly the same as that for the Hyamine, 0.004 mole except the chloroform layer will become bluer with addition of Duponol C. The end point is also indicated by equal intensity of blue color in the upper and lower layers.

CALCULATIONS $$\% \text{ Anionic} = \frac{\text{mls Hyamine} \times 0.004 \times \text{M.W.}}{\text{original sample wt}}$$

$$\% \text{ Cationic} = \frac{\text{mls Duponol C} \times 0.004 \times \text{M.W.}}{\text{original sample wt}}$$

Cationizing and Anionizing Amphoteric Emulsion Polymers of Example I

Conversion to a cationic polymer

To a 50.0 g sample of the polymer emulsion of Example I was added under good stirring 2.3 g sulfuric acid 50%. A 0.25 g sample of the acidified material was dissolved in 100 ml distilled water.

Conversion to a anionic polymer

To a 50.0 g sample of the polymer emulsion of Example I was added 1.8 g 50% sodium hydroxide aqueous solution under good stirring. A 0.5 g sample of the alkalinized material was dissolved in 100 ml distilled water.

Example II and Example III

Conversion to a cationic polymer

A 1.0 g sample of the polymer emulsion of Example II or III was dissolved in 100 ml distilled water and 0.55 g of 50% sulfuric acid solution was added under stirring.

Conversion to an anionic polymer

A 1.0 g sample of the polymer emulsion of Example II or III was dissolved in 100 ml distilled water and 1.0 g of 50% sodium hydroxide solution was added under stirring.

The six 100 ml solutions of the samples of the cationic and anionic polymer emulsions prepared above were titrated according to the procedure for determination of % activity.

|  | Duponol C | Hyamine |
|---|---|---|
| Example I |  |  |
| Acidified polymer | 1.0 ml |  |
| Alkalinized polymer |  | 3.0 ml |
| Example II |  |  |
| Acidified polymer | 3.0 ml |  |
| Alkalinized polymer |  | 4.0 ml |
| Example III |  |  |
| Acidified polymer | 2.0 ml |  |
| Alkalinized polymer |  | 1.5 ml |
| Cationic activity |  |  |
| Example I | $\frac{1.0 \times 0.004 \times 660}{0.25} =$ | 10.56% |
| Example II | $\frac{3.0 \times 0.004 \times 661}{1.0} =$ | 7.93% |
| Example III | $\frac{2.0 \times 0.004 \times 945}{1.0} =$ | 7.56% |
| Anionic activity |  |  |
| Example I | $\frac{3.0 \times 0.004 \times 660}{0.5} =$ | 15.84% |
| Example II | $\frac{4.0 \times 0.004 \times 661}{1.0} =$ | 10.57% |
| Example III | $\frac{1.5 \times 0.004 \times 945}{1.0} =$ | 5.67% |

EXAMPLE V

This example describes drainage tests using amphoteric polymer emulsions from Examples I, II and III after acid or alkaline treatment with repulped newsprint. The newsprint samples containing Example I emulsion had been treated with 2% alum on a dry pulp basis while the newsprint samples containing Examples II and III emulsions were also treated with 2.6% alum on a dry pulp basis.

The drainage time tester was a graduated plastic cylinder about 14" long with an inside diameter of 2" having a plug for each end attached to a light chain. The top plug was fitted with a short plastic tube which could be covered by the forefinger to hold the furnish in the tube after the bottom plug had been removed. The bottom plug was placed in the tester.

Waste newsprint at 2% consistency was beaten in a Noble and Wood Beater to approximately 400 C.S.F. (Canadian Standard Freeness). A 1050 ml sample of the waste newsprint pulp was diluted with 6000 ml of water to obtain 0.3% consistency furnish and was kept agitated during the entire screening process.

The tester was filled with 0.3% furnish to the zero line so that the tester contained 500 ml of furnish, i.e., 1.50 g of dry fiber.

Samples of amphoteric polymer emulsions from Examples I, II and III after acid or alkaline treatments were diluted to 0.05% solids so that 1.50 ml of diluted solution containing 0.05% solids per 1.50 g of dry fiber was equivalent to 1 lb per ton (pound of polymer per ton of dry paper).

Utilizing a 3 ml hypodermic syringe, 1.50 ml of the diluted polymer solution was injected into the furnish in the tester. Then the amounts of alum on a dry pulp basis shown above were added. The top plug was placed securely in position on the tester and the tube connected to the top plug was securely covered with the forefinger to close the tubular opening.

While the tubular opening was securely covered with the forefinger, the tester was then slowly inverted (180° angle) and returned to the upright position ten times without shaking. After the tenth inversion, the tester was returned to the upright position and the bottom plug removed with the free hand.

A predetermined drainage volume of 200 ml was chosen. With the stop watch in one hand and the tester in the other hand with the forefinger covering the tubular opening, the forefinger was removed and the stop watch started to measure the time required to drain a volume of 200 ml. As soon as the drainage volume was 200 ml, the stop watch was stopped and the elapsed time recorded. The following results were obtained with the emulsions from Examples I, II and III.

| Sample | Treatment | Drainage Time for 200 ml Volume Seconds |
|---|---|---|
| Blank Example I | | 37.5 |
| | Acid | 12.3 |
| | Alkaline | 16.5 |
| Blank Example II | | 35.0 |
| | Acid | 22.0 |
| | Alkaline | 14.5 |
| Blank Example III | | 35.0 |
| | Acid | 14.2 |
| | Alkaline | 12.5 |

The amphoteric polymer emulsion may be used in the following applications.

In pulp and papermaking processes, addition of an effective amount of the amphoteric polymer emulsion to pulp improves drainage of the pulp. From about 0.005% to about 0.5% by weight of the emulsion may be added based on the weight of dry pulp.

In secondary and tertiary recovery of petroleum by water flooding, addition of an effective amount of the amphoteric polymer emulsion to the water flood improves recovery of petroleum. From about 0.005% to about 1.0% by weight of the emulsion may be added based on the weight of water in the flood.

In treatment of sewage and industrial waste, addition of an effective amount of the amphoteric polymer emulsion to aqueous waste improves flocculation of suspended solids in aqueous suspension. From about 0.01% to about 0.5% by weight of the emulsion may be added based on the weight of the suspension.

In treatment of drilling muds for use in petroleum exploitation, an effective amount of the amphoteric polymer emulsion is added to control viscosity of the mud during drilling. The emulsion may be used to reduce or increase viscosity of the mud. From about 0.01% to about 1.0% by weight of the emulsion may be added based on the weight of mud.

While the invention has been described with reference to certain specific embodiments thereof, it is understood that it is not to be so limited since alterations and changes may be made therein which are within the full and intended scope of the appended claims.

What is claimed is:

1. An amphoteric water-in-oil self-inverting polymer emulsion comprising
   (A) from about 10 to about 50 parts by weight of a polymer selected from the group consisting of
   (1) a copolymer from about 30 to about 99 parts by weight of a water soluble nonionic vinyl monomer and from about 1 to about 70 parts by weight of a water soluble amphoteric vinyl monomer, and
   (2) a terpolymer from about 30 to 98 parts by weight of a water soluble nonionic vinyl monomer, from about 1 to about 35 parts by weight of a water soluble anionic vinyl monomer and from about 1 to about 35 parts by weight of a water soluble cationic vinyl monomer,
   (B) from about 10 to about 50 parts by weight of water,
   (C) from about 5 to about 50 parts by weight of a hydrophobic liquid,
   (D) from about 2 to about 25 parts by weight of a water-in-oil emulsifying agent, and
   (E) from about 1 to about 15 parts by weight of an inverting surfactant
   wherein the polymer is in the aqueous phase.

2. The amphoteric polymer emulsion of claim 1 wherein the polymer is from a water soluble nonionic vinyl monomer selected from the group consisting of acrylamide, methacrylamide, allyl alcohol, 3-methylallyl alcohol, vinyl chloride, vinyl methyl ether and vinyl ethyl ether.

3. The amphoteric polymer emulsion of claim 1 wherein the polymer is from a water soluble nonionic vinyl monomer selected from the group consisting of acrylamide and methacrylamide.

4. The composition of claim 1 wherein the polymer is from a water soluble cationic vinyl monomer selected from the group consisting of N-substituted-(N'-dialkylaminoalkyl)acrylamide, aminoalkylacrylate, dialkylaminoalkylacrylate, vinylpyridine, diallylalkylamine and quaternary having at least one ethylenically unsaturated substituent.

5. The composition of claim 1 wherein the polymer is from a water soluble cationic vinyl monomer selected from the group consisting of N-substituted-(N'-dialkylaminoalkyl)acrylamide and aminoalkylacrylate.

6. The composition of claim 1 wherein the polymer is from a water soluble anionic vinyl monomer selected from the group consisting of acrylic acid, 1,2-dichloroacrylic acid, 2-methylacrylic acid, ethylene sulfonic acid, fumaric acid, chlorofumaric acid, methylfumaric acid, itaconic acid, maleic acid, dichloromaleic acid, methylmaleic acid, methacrylic acid, styrene sulfonic acid, crotonic acid and salt thereof.

7. The composition of claim 1 wherein the polymer is from an amphoteric water soluble vinyl monomer which is a reaction product of a cationic water soluble vinyl monomer selected from the group consisting of N-substituted-(N'-dialkylaminoalkyl)acrylamide, aminoalkylacrylate, dialkylaminoalkylacrylate, vinylpyridine, diallylalkylamine and a quaternary having at least one ethylenically unsaturated substituent with an anionic reactant selected from the group consisting of chloroacetic acid, chlorosulfonic acid and bromoethanol sulfonic acid.

8. The amphoteric polymer emulsion of claim 1 wherein the polymer is a copolymer of acrylamide and an amphoteric vinyl monomeric reaction product of dimethylaminoethyl methacrylate and monochloroacetic acid.

9. The amphoteric polymer emulsion of claim 1 wherein the polymer is a terpolymer of acrylamide, acrylic acid and a quaternization vinyl monomeric reaction product of dimethylaminoethyl methacrylate and dimethyl sulfate.

* * * * *